United States Patent
Sudo et al.

(10) Patent No.: US 9,284,207 B2
(45) Date of Patent: Mar. 15, 2016

(54) METHOD OF MANUFACTURING GRANULATED SILICA POWDER, METHOD OF MANUFACTURING VITREOUS SILICA CRUCIBLE

(75) Inventors: Toshiaki Sudo, Akita (JP); Takuma Yoshioka, Akita (JP); Koichi Suzuki, Akita (JP); Shinsuke Yamazaki, Akita (JP)

(73) Assignee: SUMCO CORPORATION, Tokyo (JP)

( * ) Notice: Subject to any disclaimer, the term of this patent is extended or adjusted under 35 U.S.C. 154(b) by 2 days.

(21) Appl. No.: 13/308,223

(22) Filed: Nov. 30, 2011

(65) Prior Publication Data

US 2012/0137732 A1  Jun. 7, 2012

(30) Foreign Application Priority Data

Dec. 1, 2010 (JP) .................. 2010-267999

(51) Int. Cl.
| | |
|---|---|
| *C03B 19/01* | (2006.01) |
| *C03B 19/09* | (2006.01) |
| *C03B 19/06* | (2006.01) |
| *C03B 20/00* | (2006.01) |
| *B02C 23/00* | (2006.01) |
| *C03B 1/02* | (2006.01) |

(52) U.S. Cl.
CPC ................ *C03B 1/02* (2013.01); *C03B 19/095* (2013.01); *Y02P 40/52* (2015.11)

(58) Field of Classification Search
None
See application file for complete search history.

(56) References Cited

U.S. PATENT DOCUMENTS

| | | | |
|---|---|---|---|
| 4,652,411 A * | 3/1987 | Swarr et al. ...................... 264/43 |
| 5,674,792 A | 10/1997 | Moritz | |
| 5,736,206 A | 4/1998 | Englisch | |
| 2002/0029737 A1* | 3/2002 | Sato et al. ...................... 117/200 |
| 2002/0116955 A1* | 8/2002 | Enomoto et al. ................ 65/415 |
| 2003/0041623 A1* | 3/2003 | Werdecker et al. ............. 65/17.6 |
| 2004/0093900 A1* | 5/2004 | Fredholm ........................ 65/25.3 |
| 2006/0130707 A1* | 6/2006 | Grasso et al. ................. 106/697 |
| 2009/0173276 A1* | 7/2009 | Satou ............................ 117/208 |
| 2010/0005836 A1* | 1/2010 | Kishi et al. ...................... 65/124 |

(Continued)

FOREIGN PATENT DOCUMENTS

| | | |
|---|---|---|
| CN | 1066696 C | 6/2001 |
| JP | 05229839 A * | 9/1993 |
| JP | 07-033548 A | 2/1995 |

(Continued)

OTHER PUBLICATIONS

ASM International Handbook Committee, ASM Handbook, vol. 7, (1998), pp. 91-97.*
JP05-229839 Machine Translation Performed Jul. 15, 2013.*
Extended European Search Report mailed Jun. 12, 2012, issued in Corresponding European Application No. EP 11191105.3, filed Nov. 29, 2011, 6 pages.

(Continued)

*Primary Examiner* — Lisa Herring
(74) *Attorney, Agent, or Firm* — Law Office of Katsuhiro Arai

(57) ABSTRACT

The present invention provides a method of manufacturing a vitreous silica crucible having a transparent layer by use of waste vitreous silica, and silica powder suitable for the manufacturing. According to the present invention, there is provided a method of manufacturing granulated silica powder comprising a process for pulverizing waste vitreous silica generated in the manufacturing process of a crucible to form silica fine powder having an average particle diameter of 100 μm or less, and a process for granulating the silica fine powder to obtain granulated silica powder having an average particle diameter of 50 μm or more under helium atmosphere.

8 Claims, 1 Drawing Sheet

(56) References Cited

U.S. PATENT DOCUMENTS

2010/0071613 A1* 3/2010 Kishi et al. .................. 117/208
2011/0143063 A1* 6/2011 Yamagata et al. ........... 428/34.6

FOREIGN PATENT DOCUMENTS

| JP | 2000-344535 A | 12/2000 |
| JP | 2001-220157 A | 8/2001 |
| WO | 2010-125739 A1 | 11/2010 |
| WO | WO 2010125739 A1 * | 11/2010 |

OTHER PUBLICATIONS

TIPO Official Action, mailed Sep. 18, 2013, issued in corresponding Taiwanese Application No. 100143973, filed Nov. 30, 2011, 10 pages.

Industrial Bureau in Ministry of Economic Affairs, "Manual of Resource Applied Technology in Manufacturing Silicon Wafer," Industrial Bureau in Ministry of Economic Affairs and Foundation of Taiwan Green Productivity Edited, Aug. 2007, 7 pages.

* cited by examiner

METHOD OF MANUFACTURING GRANULATED SILICA POWDER, METHOD OF MANUFACTURING VITREOUS SILICA CRUCIBLE

CROSS-REFERENCE TO RELATED APPLICATION

This application is related to Japanese Patent Application No. 2010-267999 filed on Dec. 1, 2010, whose priority is claimed and the disclosure of which is incorporated by reference in its entirety.

BACKGROUND OF THE INVENTION

1. Field of the Invention

The present invention relates to a method of manufacturing granulated silica powder, and a method of manufacturing a vitreous silica crucible.

2. Description of the Related Art

In one example, a method of manufacturing a vitreous silica crucible includes a silica powder layer forming process for forming a silica powder layer by depositing silica powder having an average particle diameter of approximately 300 μm on the inner surface of a rotating mold, and an arc fusing process for arc fusing the silica powder layer while depressurizing the silica powder layer from the mold side (hereinafter, this method is referred to as "rotating mold pressure reduction method"). Furthermore, in order to make uniform the height of the crucible after the arc fusing process, a cutting-off process for cutting off the upper end portion of the crucible is carried out.

In manufacturing a two-layer structure crucible having a transparent vitreous silica layer substantially not containing bubbles (hereinafter, referred to as "transparent layer") on the inner side of the crucible, and a vitreous silica layer containing bubbles (hereinafter, referred to as "bubble-containing layer") on the outer side of the crucible, a transparent layer is formed by removing bubbles by depressurizing the silica powder layer at the beginning of the arc fusing process, and thereafter, a bubble-containing layer containing residual bubbles is formed by weakening depressurization.

In manufacturing a crucible, the rim cutting process for cutting off the upper end of a crucible is carried out on all crucibles, and a large amount of waste vitreous silica is generated in the process. Furthermore, the crucible obtained in the arc fusing process is sometimes not in compliance with the specifications, and in a case where the crucible cannot be modified to meet the specifications, the crucible is usually scrapped to generate waste vitreous silica.

Related references to the present invention are JP-A-2001-220157, and JP-A-h7-33548.

SUMMARY OF THE INVENTION

The waste vitreous silica generated in the manufacturing process of a crucible have very high purity, and thus the present inventors have tried to manufacture the above-mentioned two-layer structure crucible by pulverizing this waste vitreous silica into silica powder having an average particle diameter of approximately 300 μm and using the rotating mold pressure reduction method. However, even though the silica powder layer was strongly depressurized during the arc fusing, bubbles remained and a transparent layer was not formed.

The present invention has been made in view of these circumstances, and provides a method of manufacturing a vitreous silica crucible having a transparent layer by use of waste vitreous silica, and silica powder suitable for the manufacturing.

According to the present invention, there is provided a method of manufacturing granulated silica powder comprising a process for pulverizing waste vitreous silica generated in the manufacturing process of a crucible to form silica fine powder having an average particle diameter of 100 μm or less, and a process for granulating the silica fine powder to obtain granulated silica powder having an average particle diameter of 50 μm or more under helium atmosphere, wherein the average particle diameter of the granulated silica powder is at least twice the average particle diameter of the silica fine powder.

The inventors have investigated the reason why a transparent layer is not formed when a crucible is manufactured by use of silica powder obtained by pulverizing waste vitreous silica, and found out that the waste vitreous silica contains a large amount of bubbles, and these bubbles are not completely removed even when the waste vitreous silica was pulverized into powder having an average particle diameter of approximately 300 μm, and thus the bubbles remain inside the individual particles of the silica powder, and found out that the residual bubbles prohibit the formation of a transparent layer.

Next, the waste vitreous silica was pulverized further so as to obtain silica powder having an average particle diameter of approximately 40 μm so that the bubbles did not remain inside the particles, and the powder was used for manufacturing a crucible. However, because the silica powder was too small, the silica powder hovers in the process of depositing the silica powder on the mold inner surface, and thus there has occurred a new problem that it was difficult to form a silica powder layer having uniform thickness.

In order to solve this problem, the present inventors tried enlarging the average particle diameter of the silica powder by granulation. However, when a crucible was manufactured by use of the silica powder after the granulation, the problem of silica powder hovering was solved, but there remained the problem that the bubbles in the layer of the inner side of the crucible remained and thus a transparent layer was not formed The present inventors have considered that the residual bubbles are generated due to the air confined in the granulated particle during granulation of silica powder, and found out that it is possible to avoid the residual bubbles by carrying out granulation under helium atmosphere because helium is easier to be released than air, and thus completed the present invention.

The granulated silica powder obtained according to the present invention has an average particle diameter of 50 μm or more, and thus the problem of silica powder hovering is solved. In addition, the granulated silica powder is obtained by granulation under helium atmosphere, and thus even when helium is confined in the granulated silica powder, the helium is easily released when the granulated silica powder is fused. Therefore, the obtained vitreous silica layer does not contain residual bubbles. Therefore, by use of the granulated silica powder obtained according to the present invention, it is possible to easily manufacture a vitreous silica crucible having a transparent layer on the inner side of the crucible.

DESCRIPTION OF THE PREFERRED EMBODIMENTS

Figure 1:
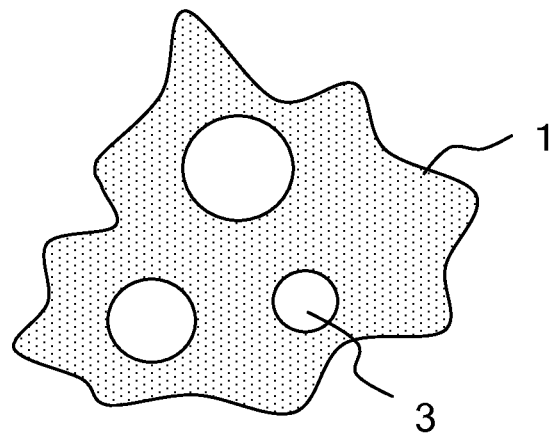
FIG. 1 is a schematic diagram showing a state of containing residual bubbles in silica powder having a particle diameter of 300 μm.

1. Method of Manufacturing Granulated Silica Powder

Hereinafter, a method of manufacturing granulated silica powder of one embodiment of the present invention will be explained.

A method of manufacturing granulated silica powder according to the present embodiment comprises a process for pulverizing waste vitreous silica generated in a manufacturing process of a crucible to form silica fine powder having an average particle diameter of 100 μm or less, and a process for granulating the silica fine powder to obtain granulated silica powder having an average particle diameter of 50 μm or more under helium atmosphere, wherein the average particle diameter of the granulated silica powder is at least twice the average particle diameter of the silica fine powder.

Hereinafter, respective components are explained in detail.

(1) Pulverization Process

First, a process of pulverizing waste vitreous silica will be explained.

A method of manufacturing granulated silica powder according to the present embodiment uses waste vitreous silica generated in the manufacturing process of a vitreous silica crucible. The waste vitreous silica includes, but is not limited to, for example, a portion cut off in the rim cutting process for cutting off an upper portion of a crucible, and vitreous silica of a crucible scrapped without being shipped when the crucible does not meet the specifications and the modification is not possible. In addition, the waste vitreous silica also includes vitreous silica generated in the manufacturing process of a crucible but not shipped as a product.

In general, the crucible is manufactured by use of natural silica powder only, or both of natural silica powder and synthetic silica powder. Natural silica powder is manufactured by pulverizing a natural mineral whose main component is α-quartz. Synthetic silica powder is manufactured by chemical synthesis, such as gas phase oxidation (dry synthesis) of silicon tetrachloride ($SiCl_4$), or hydrolysis (sol-gel method) of silicon alkoxide ($Si(OR)_4$).

In general, the waste vitreous silica is natural vitreous silica (vitreous silica formed by fusing natural silica powder followed by solidifying) or a mixture of natural vitreous silica and synthetic vitreous silica (vitreous silica formed by fusing synthetic silica powder followed by solidifying), but the composition is not in particular limited. Natural vitreous silica contains crystalline microstructure therein, and thus natural vitreous silica is not easily deformed. Thus, natural vitreous silica has relatively high viscosity. On the other hand, synthetic vitreous silica contains little or no microstructure, as in natural vitreous silica, and thus has relatively low viscosity.

In the case of a two-layer structure crucible having a natural vitreous silica layer as the outer layer and a synthetic vitreous silica layer as the inner layer, a large portion of the wall thickness is a natural vitreous silica layer, and thus a large portion of the constituent of waste vitreous silica is natural vitreous silica. When a crucible has a layer containing a mineralizer, the waste vitreous silica can also contain a mineralizer. When the waste vitreous silica contains a large amount of the mineralizer, the mineralizer can be mixed into silicon melt during use of the crucible manufactured by use of the waste vitreous silica, or the entire crucible becomes more easily crystallized, which leads to the crack of the crucible.

Therefore, the mineralizer concentration of the waste vitreous silica is preferred to be low. The mineralizer concentration is preferably 15 ppm or less, and more preferably 10 ppm or less, and even more preferably 5 ppm or less. The mineralizer promotes crystallization of vitreous silica, and is, for example, a metal impurity, specifically, for example, alkali metal (e.g., sodium or potassium), alkali earth metal (e.g., magnesium, calcium, strontium, or barium), aluminum, iron.

When a crucible has a bubble layer, the waste vitreous silica contains bubbles. When the waste vitreous silica is pulverized to form silica powder having an average particle diameter of approximately 300 μm, which is a common size for silica powder used in the rotating mold method, the bubbles are not completely removed, as shown in FIG. 1, and bubbles 3 remains in the silica powder 1 after pulverization. Because of the residual bubbles, when a crucible is manufactured by use of silica powder obtained by pulverizing the waste vitreous silica into an average particle diameter of approximately 300 μm, a vitreous silica layer of the resultant crucible contains residual bubbles even when a transparent layer is intended to be formed.

Figure 2:
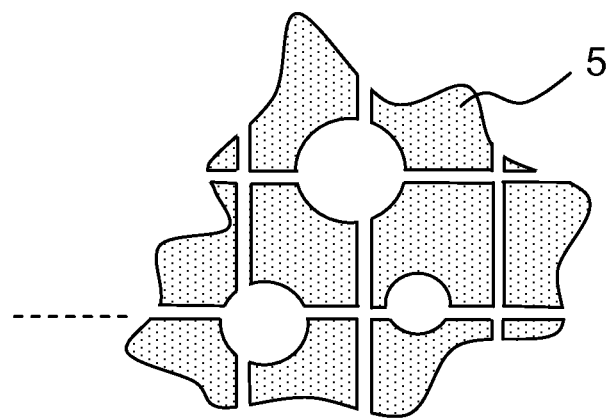
FIG. 2 is a schematic diagram showing a state of not containing residual bubbles in silica powder having a particle diameter of 100 μm.

In the pulverization process of the present embodiment, the waste vitreous silica is pulverized to form silica fine powder having an average particle diameter of 100 μm or less, and thus the silica fine powder 5 as shown in FIG. 2 is difficult to contain residual bubbles, and thus the problem of the residual bubbles in a vitreous silica layer is solved. In the present specification, an "average particle diameter" represents a particle diameter at an integrated value of 50% in the particle size distribution obtained by the laser diffraction/scattering method. FIG. 1 and FIG. 2 are schematic diagrams to understand the significance of the present invention, and they do not limit the scope of the present invention.

The method of pulverizing waste vitreous silica is not in particular limited, and the waste vitreous silica can be pulverized by use of a ball mill. The average particle diameter of silica fine powder after pulverization is, for example, 0.1, 1, 10, 20, 40, 50, 60, 80, or 100 μm, and it can be in the range between two values of the values exemplified here. The average particle diameter of silica fine powder is preferred to be 50 μm or less. The size of bubbles in the waste vitreous silica is approximately 50 μm in diameter, and thus bubbles can be more certainly removed by pulverizing the waste vitreous silica into an average particle diameter of 50 μm or more. Furthermore, the average particle diameter of silica fine powder is preferred to be 1 μm or more. When the average particle diameter of silica fine powder is too small, the pulverization takes too much effort. The silica fine powder obtained by pulverization has a certain level of particle diameter distribution, and thus it is preferred to remove particles having a particle diameter of 100 μm or more (or 50 μm or more) by use of a sieve or the like.

(2) Granulation Process

Next, a process of granulating silica fine powder will be explained.

In the present embodiment, the silica fine powder is granulated under helium atmosphere to obtain granulated silica powder having an average particle diameter of 50 μm or more. When the average particle diameter of the granulated silica powder is less than 50 μm, the granulated silica powder can hover in forming a silica powder layer to manufacture a crucible, and thus is difficult to handle. Furthermore, the average particle diameter is preferred to be 200 μm or more. In this case, the powder is even more difficult to hover, and thus a silica powder layer is easier to be formed. It is natural that the average particle diameter of the granulated silica powder is at least twice the average particle diameter of silica fine powder. The value of the average particle diameter of the granulated silica powder (the average particle diameter of silica fine powder) is, for example, 2, 3, 4, 6, 8, 10, 15, 20, or 50 µm, and it can be in the range between two values of the values exemplified here.

The granulated silica powder obtained by the granulation contain particles having a relatively small particle diameter, and thus it is preferred to remove particles having a particle diameter of 50 µm or less by use of sieve or the like. There is not in particular an upper limit for the average particle diameter of the granulated silica powder. However, when the diameter is too large, it becomes too difficult to form a silica powder layer having a uniform thickness, and thus the diameter is preferred to be 600 µm or less. The average particle diameter of the granulated silica powder is, for example, 50, 100, 200, 300, 400, 500, 600, 800, or 1000 µm, and it can be in the range between two values of the values exemplified here.

The method of granulation is not in particular limited as long as the method can be carried out under helium atmosphere. The granulation can be carried out by a process such as fluidized bed granulation or spray dry. In the fluidized bed granulation process, powder is stirred up by use of hot air from below a mixer, and a binder is sprayed from above to aggregate the powder to obtain a granulated particle. As the binder, water, alcohol, organic solvent, or the like can be used, and water is preferable because there is no risk of contamination due to residual organic constituent. In the spray dry process, silica fine powder and a dispersion medium are mixed to form slurry, and the slurry is sprayed into airflow and dried to granulate the silica fine powder. Because the spray dry process is simple, the process is suitable for continuous production and mass production. In the spray dry process, the direction of spraying the slurry may be the same as that of airflow (parallel flow) or opposite to that of airflow (countercurrent flow). The slurry used in the spray dry process can be prepared by mixing the silica fine powder and the dispersion medium. As the binder, water, alcohol, organic solvent or the like can be used, and water is preferable because there is no risk of contamination due to residual organic constituent.

The temperature of the hot air used during granulation is, for example, 100 to 300 degrees C. in the inlet temperature (temperature just after the hot air is injected into the apparatus). When the hot air temperature is too low, drying becomes insufficient and when the hot air temperature is too high, waste energy consumption increases. The temperature and the flow rate of the hot air are appropriately selected depending on the desired particle diameter of the granulated silica powder, the kind of the binder, and the boiling point of the dispersion medium. The temperature is specifically, for example, 100, 150, 200, 250, 300 degrees C., and it can be in the range between two values of the values exemplified here.

In general, granulation is carried out by use of air or nitrogen in view of the cost and so on. However, in the present embodiment, helium is used. When helium is used, the granulated silica powder is less likely to contain bubbles than when air or nitrogen is used. In addition, even when bubbles are contained in the granulated silica powder, the bubbles are easily released in manufacturing a crucible, and thus they are not left in the vitreous silica layer. Therefore, when the granulated silica powder granulated under helium atmosphere is used, it is easy to manufacture a vitreous silica crucible having a transparent layer.

2. Method of Manufacturing Vitreous Silica Crucible

A method of manufacturing a vitreous silica crucible according to the present embodiment comprising a granulated silica powder manufacturing process for manufacturing granulated silica powder by the method of manufacturing granulated silica powder, and a vitreous silica layer forming process for forming a vitreous silica layer by fusing the manufactured granulated silica powder, followed by cooling.

In this method, a vitreous silica crucible can be manufactured by (1) forming a silica powder layer by depositing granulated silica powder manufactured in the aforementioned method on the bottom and the side of a rotating mold, and (2) arc fusing the silica powder layer followed by cooling to vitrify it.

A transparent layer having virtually no bubbles (i.e., bubble content of less than 0.5% volume) can be formed by subjecting the silica powder layer to a reduced pressure of −50 kPa or more and less than −95 kPa while fusing the silica powder layer. Furthermore, after the transparent layer is formed, a bubble-containing layer having a bubble content of 0.5% or more and less than 50% can be formed on the outer side of the transparent layer by subjecting the silica powder layer to a pressure of 0 kPa or more and less than −10 kPa. In the present specification, the bubble content rate refers to the ratio ($w_2/w_1$) of the volume ($w_2$) occupied by bubbles in a unit volume ($w_1$) of the crucible. In the present specification, the value of the pressure is the value with reference to the ambient air pressure.

The arc fusing may be carried out after new synthetic silica powder is deposited on the silica powder layer formed of the granulated silica powder (hereinafter "granulated silica powder layer"). In this case, a synthetic vitreous silica layer is formed on a vitreous silica layer formed of the granulated silica powder. Because the granulated silica powder is primarily formed of natural vitreous silica, the impurity concentration is relatively high. Therefore, a synthetic silica powder layer can be formed on the granulated silica powder layer to reduce the impurity concentration of the crucible inner surface which contacts silicon melt so that mixing of impurities into silicon melt can be prevented.

Furthermore, the synthetic vitreous silica layer can be formed on the crucible inner surface by the spraying method. In other words, when the granulated silica powder layer is arc fused, synthetic silica powder is sprayed onto the crucible wall, and when the synthetic silica powder is attached to the wall, the synthetic silica powder is fused to form a synthetic vitreous silica layer on the crucible inner surface. This method also can reduce the impurity concentration of the crucible inner surface and prevent mixing of impurities into silicon melt.

3. Method of Manufacturing Silicon Ingot

A silicon ingot can be manufactured by the processes of (1) forming silicon melt by melting polycrystalline silicon in the vitreous silica crucible 1 of the present embodiment, and (2) dipping an end of a silicon seed crystal to the silicon melt, and pulling the seed crystal while rotating the seed crystal. The silicon single crystal has a shape having, from the upper side, a cylindrical silicon seed crystal, a cone-shaped silicon single crystal, a cylindrical silicon single crystal having the same diameter as the base of the upper cone (hereinafter, referred to as "straight body portion"), a cone-shaped silicon single crystal having a downward apex.

In order to pull a silicon single crystal multiple times, polycrystalline silicon is recharged and melted in the vitreous silica crucible, and a silicon ingot is pulled again.

EXAMPLE

Example 1

An upper end of a crucible is cut off in the rim cutting process after the arc fusing process in the manufacturing process of a two-layer structure vitreous silica crucible having a transparent layer on the inner surface side and a bubble-containing layer on the outer surface side, and the cut-off vitreous silica is collected as waste vitreous silica. The waste vitreous silica is pulverized to obtain a silica fine powder having an average particle diameter of about 10 μm. Then, the silica fine powder was mixed with water in the weight ratio of 1:1 to form slurry, and the slurry was sprayed into helium airflow of 150 deg. C. for drying to obtain granulated silica powder having an average particle diameter of about 100 μm.

A crucible was manufactured by use of the manufactured granulated silica powder by the rotating mold method. Specifically, the granulated silica powder was deposited on the bottom and the side of a rotating mold in a thickness of 25 mm to form a silica powder layer. The silica powder layer was fused by arc discharge followed by solidifying to vitrify the silica powder layer, to manufacture a vitreous silica crucible. During the arc discharge, first, the silica powder layer was depressurized to −80 kPa from the mold side to form a vitreous silica layer while removing the bubbles therefrom, and thereafter the pressure of the depressurization was changed to 0 kPa or more and less than −10 kPa to form a bubble-containing layer. The obtained vitreous silica crucible was inspected, and it was found out that the vitreous silica layer from which the bubbles were removed by depressurization (hereinafter referred to as "inner surface layer") was a transparent layer substantially not containing residual bubbles.

Examples 2 to 6, Comparative Examples 1 to 4

The average particle diameter of silica fine powder, the average particle diameter of the granulated silica powder, and atmosphere gas during granulation was changed as shown in Table 1, and the state of the bubbles of the inner surface layer was inspected. The result is also shown in Table 1.

TABLE 1

| | Average Particle Diameter of Silica Fine Powder (μm) | Average Particle Diameter of Granulated Silica Powder (μm) | Atmosphere Gas During Granulation | Bubbles of Inner Surface Layer |
|---|---|---|---|---|
| Exe 1 | 10 | 100 | Helium | None |
| Ex. 2 | 10 | 200 | Helium | None |
| Ex. 3 | 10 | 600 | Helium | None |
| Ex. 4 | 50 | 200 | Helium | None |
| Ex. 5 | 50 | 600 | Helium | None |
| Ex. 6 | 100 | 300 | Helium | None |
| Comp. Ex. 1 | 10 | 200 | Nitrogen | Exist |
| Comp. Ex. 2 | 10 | 40 | Helium | — |
| Comp. Ex. 3 | 120 | 300 | Helium | Exist |
| Comp. Ex. 4 | 300 | (No Granulation) | (No Granulation) | Exist |

As shown in Table 1, when the granulated silica powder granulated according to the method of the present invention is used (Examples 1 to 6), the inner surface layer was a transparent layer substantially not containing residual bubbles. On the other hand, when the atmosphere gas during granulation is not helium (Comparative Example 1) or when the average particle diameter of silica fine powder is over 100 μm (Comparative Example 3), the inner surface layer contained residual bubbles. Furthermore, when the average particle diameter of the granulated silica powder was less than 50 μm (Comparative Example 2), the silica powder layer was difficult to form because the granulated silica powder hovered in forming the silica powder layer, and thus the manufacturing of the crucible was not completed. Furthermore, in Comparative Example 4, silica fine powder having a particle diameter of approx. 300 μm was prepared by pulverization and the silica fine powder was used as it is without granulation to manufacture a crucible, and the obtained inner surface layer contained residual bubbles.

EXPLANATION OF REFERENCE SYMBOL

1: Silica Powder
3: Bubble
5: Silica Fine Powder

What is claimed is:

1. A method of manufacturing a vitreous silica crucible having a transparent layer using waste vitreous silica containing a large amount of bubbles, the method comprising:
providing waste vitreous silica containing a large amount of bubbles generated in the manufacturing process of a crucible, said waste vitreous silica containing 15 ppm or less of a mineralizer,
pulverizing the waste vitreous silica to form silica fine powder having an average particle diameter between 10 μm or more and 100 μm or less, said average particle diameter being set to remove most bubbles trapped in the waste vitreous silica,
granulating the silica fine powder to obtain granulated silica powder having an average particle diameter of 200 to 600 μm, without organic components under helium atmosphere, and
forming a transparent vitreous silica layer by fusing the granulated silica powder, wherein substantially all bubbles are removed while the granulated silica powder is fused, followed by cooling,
wherein the transparent vitreous silica layer is formed by forming a silica powder layer by depositing the granulated silica powder on the bottom and the side of a rotating mold, and fusing the silica powder layer by arc fusing the silica powder layer followed by cooling to vitrify it;
wherein the transparent vitreous silica layer is formed by subjecting the silica powder layer to a reduced pressure of −50 kPa or more and less than −95 kPa while fusing the silica powder layer.

2. The method of claim 1, wherein the silica fine powder was granulated by preparing slurry by mixing the silica fine powder and a dispersion medium, and spraying the slurry into airflow and drying the slurry.

3. The method of claim 2, wherein the airflow is helium airflow having an inlet temperature of 100 to 300 deg. C.

4. The method of claim 2, wherein the dispersion medium is water.

5. The method of claim 1, wherein the arc fusing is carried out after new synthetic silica powder is deposited on the silica powder layer formed of the granulated silica powder.

6. The method of claim 1, wherein synthetic silica powder is sprayed onto a crucible wall during arc fusing the granulated silica powder layer.

7. The method of claim 1, wherein the transparent vitreous silica layer formed from the waste vitreous silica containing a large amount of bubbles has a bubble content of less than 0.5% by volume.

8. The method of claim 1, wherein the step of pulverizing the waste vitreous silica further comprises removing particles having a particle diameter of 100 μm or more.

* * * * *